No. 745,567. PATENTED DEC. 1, 1903.
H. S. BURRELL.
LUBRICATOR.
APPLICATION FILED NOV. 6, 1902.
NO MODEL.
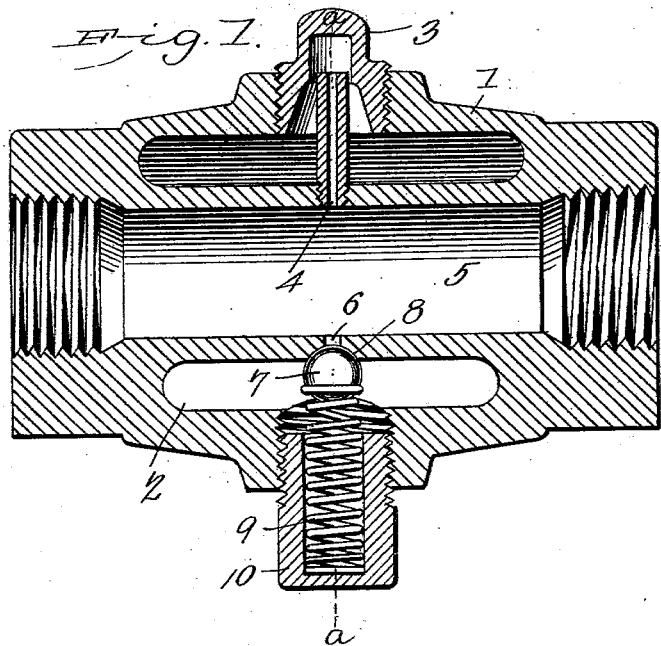
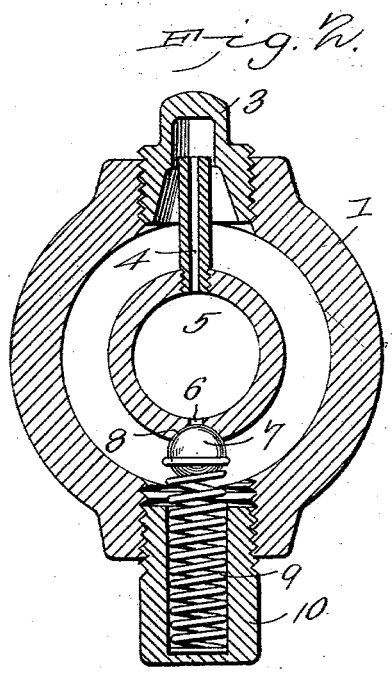
Witnesses
H. S. Burrell, Inventor
by C. A. Snow & Co.
Attorneys No. 745,567.

Patented December 1, 1903.

UNITED STATES PATENT OFFICE.

HARRY STEPHEN BURRELL, OF BELLEVILLE, CANADA.

LUBRICATOR.

SPECIFICATION forming part of Letters Patent No. 745,567, dated December 1, 1903.

Application filed November 6, 1902. Serial No. 130,294. (No model.)

*To all whom it may concern:*

Be it known that I, HARRY STEPHEN BURRELL, a subject of the King of Great Britain and Ireland, residing at Belleville, in the Province of Ontario, Dominion of Canada, have invented a new and useful Lubricator, of which the following is a specification.

The object of the present invention is to provide an improved form of lubricating device for rock-drills and similar devices; and to this end it comprises a lubricant-reservoir arranged in communication with the steam or other fluid pressure by which the drill is actuated, the shock or jar from the drilling operation permitting the escape of small quantities of oil to the feed-pipe and the oil being carried with the steam or air to the valve-chest and cylinder of the rock-drill.

While the device is adapted more especially for application to mechanisms in which there is some shock or jar during operation, it may also be applied to any form of fluid-actuated motors with but slight modification in the mechanism for controlling the flow of oil.

In the accompanying drawings, Figure 1 is a longitudinal section of a lubricator constructed in accordance with my invention, the device being illustrated in the form of a coupling, which may be connected at a desired point in the fluid-pressure-supply pipe, preferably at a point adjacent to the valve-chest. Fig. 2 is a transverse sectional elevation of the same on the line *a a* of Fig. 1.

In the present embodiment of the invention the casing of the lubricator is in the form of a pipe-coupling 1, which may be placed at any point in the pipe for conveying the steam or air or other actuating fluid to the rock-drill or engine, the coupling being preferably disposed at a point adjacent to the valve-chest in order that it may be subjected to the vibrations resulting from the impact of the drilling-tool. The intermediate portion of this coupling-section is cored out to form an annular chamber or reservoir 2, in which a suitable lubricant may be introduced by the removal of the plug 3, the latter being screwed into a threaded opening communicating with the reservoir.

In order that the contents of the reservoir may be subjected to the pressure of the actuating fluid, a small tube 4 extends from a threaded opening in the inner wall of the reservoir to a recess formed in the plug 3, the upper end of the tube being above the liquid-level and permitting the passage of the fluid passing through the channel 5 to the reservoir at a point above the oil.

At a point diametrically opposite the tube 4 the inner wall of the reservoir is provided with an oil-escape passage 6, normally closed by a ball-valve 7, adapted to a tapering valve-seat 8. The valve is held to its seat by a compression-spring 9, one end of which is seated in a recess in a plug 10, adapted to a threaded opening in the outer wall of the reservoir, the spring serving to hold the valve closely to its seat and prevent the escape of oil into the passage 5 when the rock-drill or other engine is not in operation.

As soon as the rock-drill or engine is set into motion the vibration or shock will be found sufficient to move the ball 7 slightly away from its seat or to rock the same on its seat to a position sufficient to permit a small quantity of oil to flow through the opening 6, the oil being caught up by the actuating fluid and carried to the valve-chest and cylinder of the rock-drill or engine.

The position of the parts may be changed to suit varying conditions of use, and the shape of the valve may be altered, and while the construction herein described, and illustrated in the accompanying drawings, is the preferred form of the device it is obvious that various changes in the form, proportions, size, and minor details of the structure may be made without departing from the spirit or sacrificing any of the advantages of the invention.

Having thus described my invention, what I claim is—

1. A pressure-lubricator comprising an annular reservoir arranged around a fluid-pressure-supply pipe, there being a lubricant-discharge opening extending between the pipe and the lower portion of the reservoir, a spring-pressed valve normally closing the opening, and a tube extending between the pipe and the upper portion of said reservoir.

2. A lubricating device comprising a pipe-coupling section cored to form an annular oil-reservoir, there being an opening extending between the lower portion of the pipebore and the lower portion of the reservoir, a spring-pressed valve normally closing said opening, and movable to open position by the shock and jar of the operating member to which the device is attached, and a tube extending between the pipe and the upper portion of said reservoir.

3. A lubricating device comprising a pipe-coupling section cored to form an oil-reservoir and provided with oppositely-disposed threaded openings in its exterior walls, recessed plugs adapted to said threaded openings, a tube extending through the inner wall of the reservoir and opening into the interior of said reservoir, an oil-discharge opening from the reservoir to the interior of the coupling, a ball-valve within the reservoir, an inclined valve-seat around said opening for the valve, and a compression-spring normally tending to maintain the valve in closed position, the tube and spring being each disposed in alinement with one of the recessed plugs.

In testimony that I claim the foregoing as my own I have hereto affixed my signature in the presence of two witnesses.

HARRY STEPHEN BURRELL.

Witnesses:
G. KOTCHAPAW,
J. S. TOWER.